(12) United States Patent
Hori et al.

(10) Patent No.: US 7,765,886 B2
(45) Date of Patent: Aug. 3, 2010

(54) AUTOMATIC TRANSMISSION

(75) Inventors: Yoshiaki Hori, Saitama (JP); Toshiyuki Sato, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 760 days.

(21) Appl. No.: 11/392,711

(22) Filed: Mar. 30, 2006

(65) Prior Publication Data

US 2006/0219034 A1 Oct. 5, 2006

(30) Foreign Application Priority Data

Mar. 31, 2005 (JP) ............................. 2005-101035

(51) Int. Cl.
*F16H 3/22* (2006.01)
(52) U.S. Cl. .............................. 74/343; 74/340; 74/346
(58) Field of Classification Search .................. 74/340, 74/342, 343, 346
See application file for complete search history.

(56) References Cited

U.S. PATENT DOCUMENTS

| | | | | | |
|---|---|---|---|---|---|
| 3,906,817 | A | * | 9/1975 | Kreitzberg | 74/745 |
| 4,489,622 | A | * | 12/1984 | Underwood | 74/361 |
| 4,881,417 | A | * | 11/1989 | Yoshii et al. | 74/15.84 |
| 5,170,679 | A | | 12/1992 | Merkle | |
| 6,378,675 | B1 | * | 4/2002 | Kundermann et al. | 192/3.27 |
| 6,837,475 | B2 | * | 1/2005 | Ogata et al. | 251/90 |
| 7,171,867 | B2 | * | 2/2007 | McCrary et al. | 74/331 |
| 7,305,900 | B2 | * | 12/2007 | Suzuki et al. | 74/340 |
| 7,416,514 | B2 | * | 8/2008 | Dell et al. | 477/80 |
| 2003/0178278 | A1 | * | 9/2003 | Shigyo | 192/48.8 |
| 2004/0025630 | A1 | | 2/2004 | Hori et al. | |

FOREIGN PATENT DOCUMENTS

| | | |
|---|---|---|
| CA | 2 552 409 A1 | 7/2005 |
| DE | 40 05 383 | 8/1991 |
| EP | 1 580 454 | 9/2005 |
| JP | S63 196829 U | 12/1988 |
| JP | 04 054353 A | 2/1992 |
| JP | 8-4788 A | 1/1996 |
| JP | 08-320054 A | 12/1996 |
| JP | 2003-166617 A | 6/2003 |
| WO | WO-2005/065976 A1 | 7/2005 |

\* cited by examiner

*Primary Examiner*—Ha D. Ho
(74) *Attorney, Agent, or Firm*—Birch, Stewart, Kolasch & Birch, LLP

(57) ABSTRACT

An automatic transmission that includes oil passages with a simple structure provided for twin clutches can allow the number of production steps to be reduced. The automatic transmission includes a number of gear trains equal to the number of speeds between a primary shaft and a countershaft. The automatic transmission performs connection and disconnection of a rotational driving force between a crankshaft and a gearbox by means of twin hydraulic clutches including first and second clutches, which are made of the same components and disposed on the axis of the primary shaft back to back. Oil passages can be formed into a more simple shape and can be configured to have the same total length. The first clutch performs connection and disconnection for first and third speeds, and the second clutch performs connection and disconnection for second and fourth speeds.

22 Claims, 4 Drawing Sheets

AUTOMATIC TRANSMISSION

CROSS-REFERENCE TO RELATED APPLICATIONS

This nonprovisional application claims priority under 35 U.S.C. §119(a) on Patent Application No. 2005-101035, filed in Japan on Mar. 31, 2005, the entirety of which is incorporated herein by reference.

BACKGROUND OF THE INVENTION

1. Field of the Invention

The present invention relates to an automatic transmission. In particular, the present invention relates to an automatic transmission including twin clutches hydraulically driven and controlled.

2. Description of Background Art

An automatic transmission mounted on an internal combustion engine, that includes twin clutches is known in the background art. This automatic transmission includes two clutches (first and second clutches) between a crankshaft and a gearbox. The automatic transmission is capable of sequentially shifting gears without stopping a driving force by alternately connecting and disconnecting the first and second clutches in parallel to an automatic gear shift operation by an actuator and the like. The automatic transmission including the twin clutches includes a number of gear pairs equal to the number of speeds and is configured to select which gear pair the driving force is transmitted to by connecting or disconnecting the first and second clutches and sliding a gear shift mechanism provided for a shaft rotatably supporting the gear pairs about respective axes thereof. With regard to the twin clutches, a system of selecting speeds adjacent to each other (for example, second and third speeds) by engagement of different clutches is also known in the background art.

Japanese Patent Laid-open Publication No. 8-4788 discloses a twin clutch type transmission in which twin clutches including first and second clutches are attached to one end of a crankshaft and a driving force is taken out from a double shaft connected to the twin clutches. However, in the twin clutch type transmission of Japanese Patent Laid-open Publication No. 8-4788, the first and second clutches are hydraulically controlled independently and are accommodated in a single housing. It is therefore necessary to form a complicated oil passage inside the housing and double shaft. This leads to a problem of increasing the number of production steps. Moreover, there were problems such that the total length of the oil passage is increased and a difference between distances from a hydraulic pressure source to the first and second clutches makes it difficult to attain uniform accuracy of hydraulic control.

SUMMARY OF THE INVENTION

An object of the present invention is to solve the aforementioned problems associated with the background art technology and to provide an automatic transmission which includes an oil passage with a simple structure provided for the twin clutches and allows the number of production steps to be reduced.

To achieve the aforementioned object, in an automatic transmission which includes: a gearbox having a main shaft and a countershaft; and twin clutches having a first clutch and a second clutch and performs connection and disconnection of a rotational driving force between a crankshaft and the gearbox, a first characteristic of the present invention is that the first and second clutches are hydraulic clutches and are disposed on the main shaft back to back.

A second characteristic of the present invention is that a primary gear to transmit the rotational driving force of the crankshaft to the main shaft is disposed between the first and second clutches.

Furthermore, a third characteristic of the present invention is that the first clutch performs connection and disconnection of a rotational driving force between the crankshaft and any one of an odd gear group and an even gear group of the gearbox, and the second clutch performs connection and disconnection of a rotational driving force between the crankshaft and the other gear group.

According to first and second aspects of the present invention, the first and second clutches are disposed on the same main shaft, so that oil pressure for controlling the twin clutches can be supplied from one end of the main shaft. Accordingly, the source of oil pressure can be concentrated on the one end, and oil passages to supply the oil pressure can be formed into a simple shape with a short total length. Moreover, it is possible to easily make the two oil passages the same length and thus easily achieve uniform response in hydraulic control. Furthermore, constituting the first and second clutches with the same components can reduce the number of production steps.

According to a third aspect of the present invention, it can be configured so that the connection/disconnection state of the rotational driving force can be switched alternately by the two clutches between adjacent gear ratios. It is therefore possible to obtain an automatic transmission capable of performing a quick gear shift operation with less gear shift shock.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
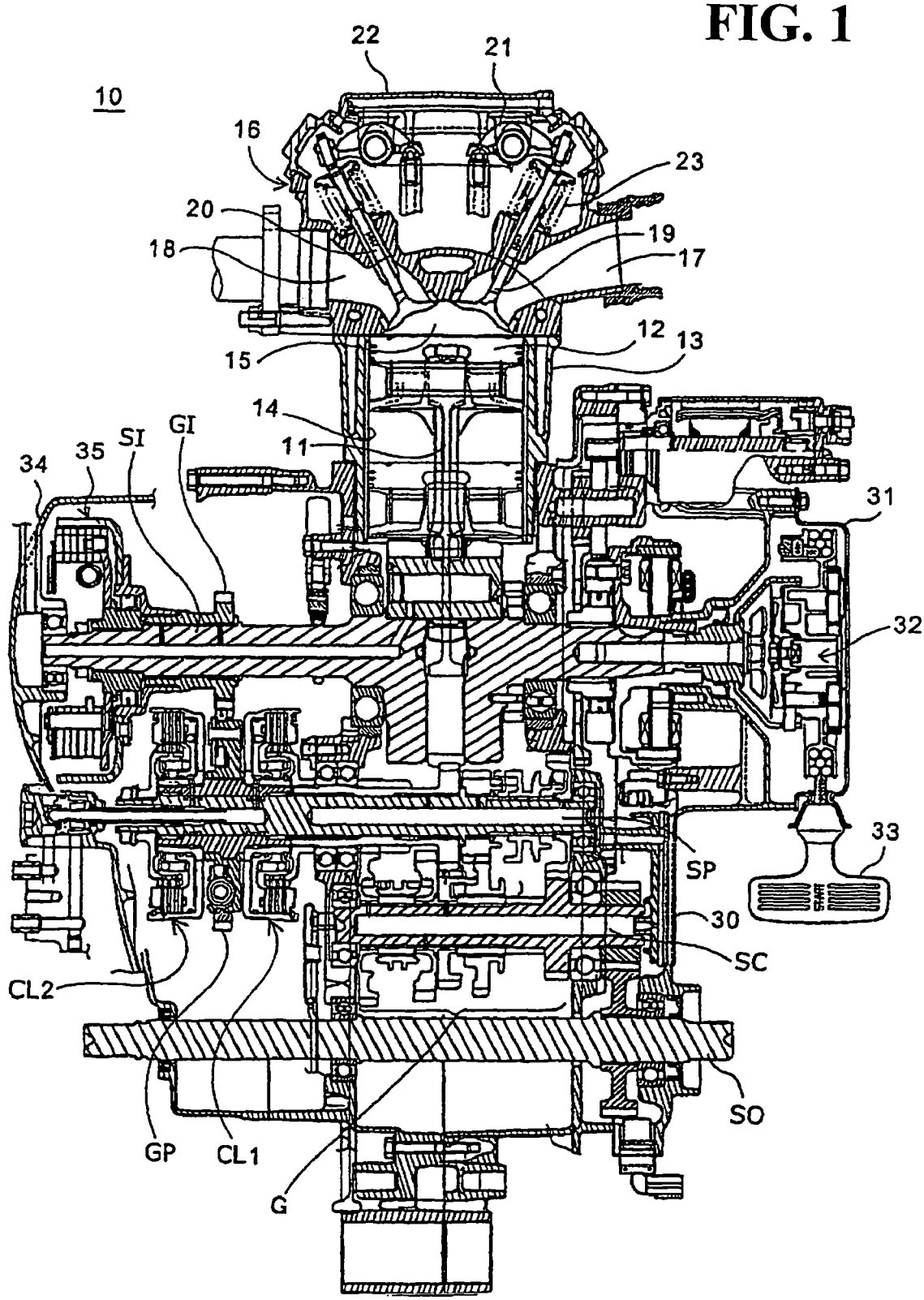
FIG. 1 is a cross-sectional view of an embodiment of an internal combustion engine to which the present invention is applied.

The present invention will now be described with reference to the accompanying drawings, wherein the same or similar elements will be identified with the same reference numerals.

FIG. 1 is a cross-sectional view of an internal combustion engine to which an automatic transmission of an embodiment of the present invention is applied. An internal combustion engine 10 is a four cycle single cylinder engine and is mounted on, for example, a four-wheel all terrain vehicle (a saddle type vehicle for rough terrain). A crank shaft SI, which is rotatably supported about an axis thereof by a crankcase 30, is provided with a piston 12, which is connected thereto with a connecting rod 11 interposed therebetween. The piston 12 is slidable within a cylinder 14 provided in a cylinder block 13, and a cylinder head 16 is fixed to an upper part (in the drawing) of the cylinder block 13. The cylinder head 16, cylinder 14, and piston 12 define a combustion chamber 15 for combustion of a gas mixture. In the cylinder head 16, which is covered with a cylinder head cover 22, valves 19 and 20 to control intake through an intake port 17 and exhaust through an exhaust port 18 and a spark plug (not shown) to ignite a compressed gas mixture are disposed. Moreover, opening and closing actions of each of the valves 19 and 20 are controlled by a rocker arm 21, which is driven to swing by rotation of a not-shown camshaft, and a valve spring 23, which is formed of a coil spring.

In a right end of the crankshaft SI in the drawing, a starter apparatus 32 for use in manually starting the internal combustion engine 10 is provided. A grip 33, which is disposed on a cover 31 of the starter apparatus 32, is connected to one end of a long rope wound around a bobbin fixedly coupled with the crankshaft SI. Pulling out the grip 33 can directly rotate the crankshaft SI manually.

At a left end of the crankshaft SI, a starting clutch 35, which is covered with a clutch cover 34, is provided. The starting clutch 35 is configured not to transmit rotational driving force of the crankshaft SI to an output gear GI when engine revolutions, or rotational speed of the crankshaft SI, is not more than a predetermined value (for example, 2000 rpm). The rotational driving force generated in the crankshaft SI is transmitted from the output gear GI through a primary gear GP, a primary shaft SP as a main shaft, a change-speed gear train G composed of a plurality of gear pairs provided for the primary shaft SP and a countershaft SC as a countershaft finally to an output shaft SO. The automatic transmission is composed of an entire unit from the primary gear GP to the output shaft SO. Twin clutches included in the automatic transmission include first and second clutches CL1 and CL2, which are disposed in the left end of the primary shaft SP in the drawing. The first and second clutches CL1 and CL2 are disposed on either side of the primary gear GP. Hydraulic pressure sources for hydraulic control and oil passages connected thereto are concentrated at the left end of the primary shaft SP. The arrangement of the first and second clutches CL1 and CL2 and an oil passage structure accompanied with this arrangement will be described below.

Figure 2:
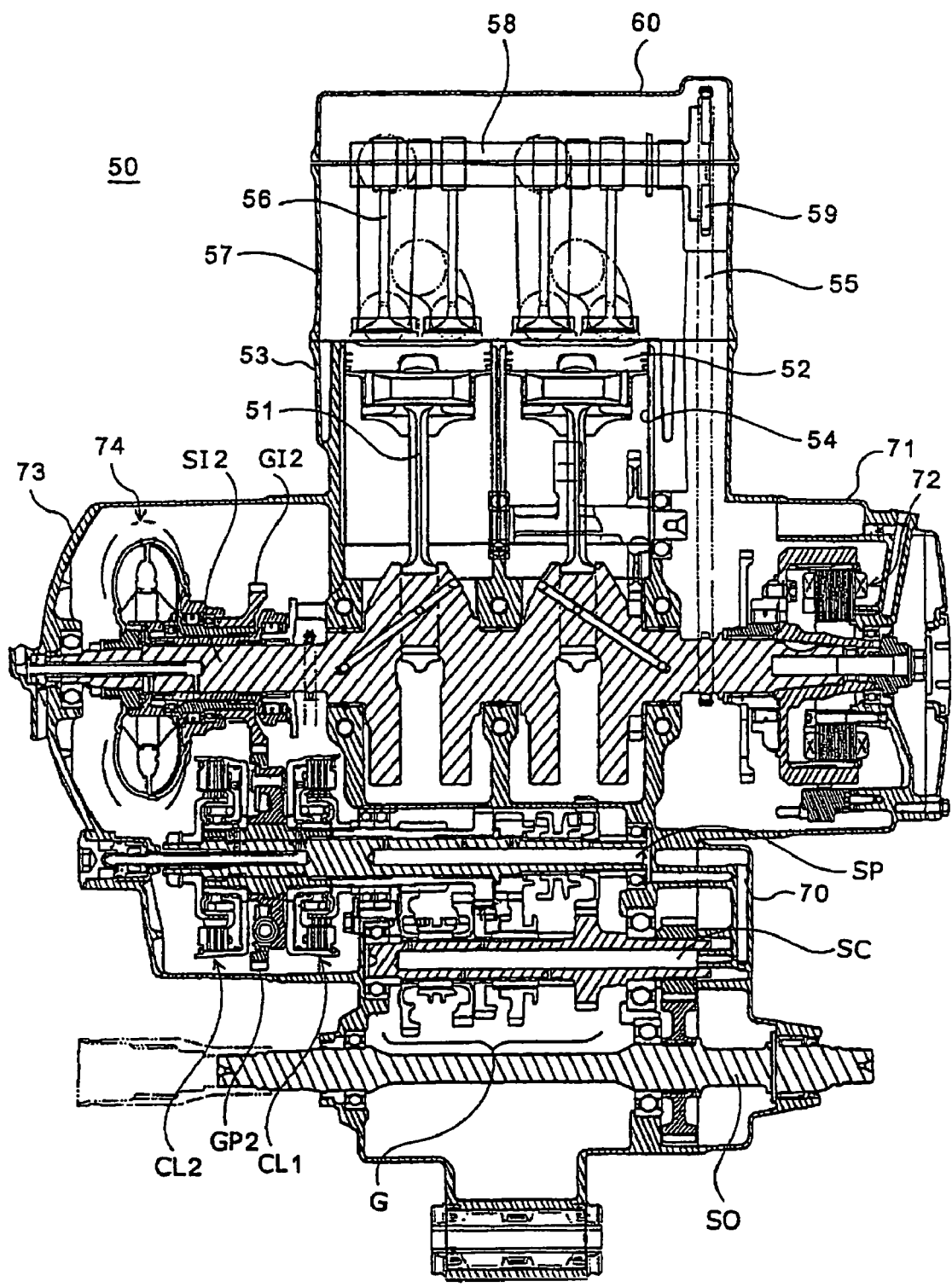
FIG. 2 is a cross-sectional view of an embodiment of the internal combustion engine to which the present invention is applied.

FIG. 2 is a cross-sectional view of an internal combustion engine to which an automatic transmission of another embodiment of the present invention is applied. An internal combustion engine 50 is a four cycle twin cylinder engine including a torque converter 74 provided for a crankshaft SI2. In the internal combustion engine 50, two pistons 52 that are slidable within respective cylinders 54 in a cylinder block 53 are provided for the crankshaft SI2 with connecting rods 51 interposed therebetween. Within a cylinder head 57, which is covered with a cylinder head cover 60, a camshaft 58 is accommodated and fixedly coupled to a sprocket 59 that is rotatably driven by a cam chain 55. It is configured so that a plurality of valves 56 are driven by the camshaft 58 to open and close. At the right end of the crankshaft SI2, which is rotatably supported about an axis thereof by a crankcase 70, an ACG starter motor 72, which is covered with a cover 71, is fixed. A torque converter 74, which is covered with a cover 73 at the left end of the crankshaft SI2, is a known torque converter that transmits a rotational driving force to an output gear GI2 when a rotational speed of the crankshaft SI2 reaches a predetermined value or more. The rotational driving force transmitted to the output gear GI2 is outputted from a primary gear GP2 through a gear train G, which is disposed on the primary shaft SP and a countershaft SC, finally to an output shaft SO. The first and second clutches CL1 and CL2 constituting the twin clutches of the automatic transmission are disposed at the left end of the primary shaft SP.

Figure 3:
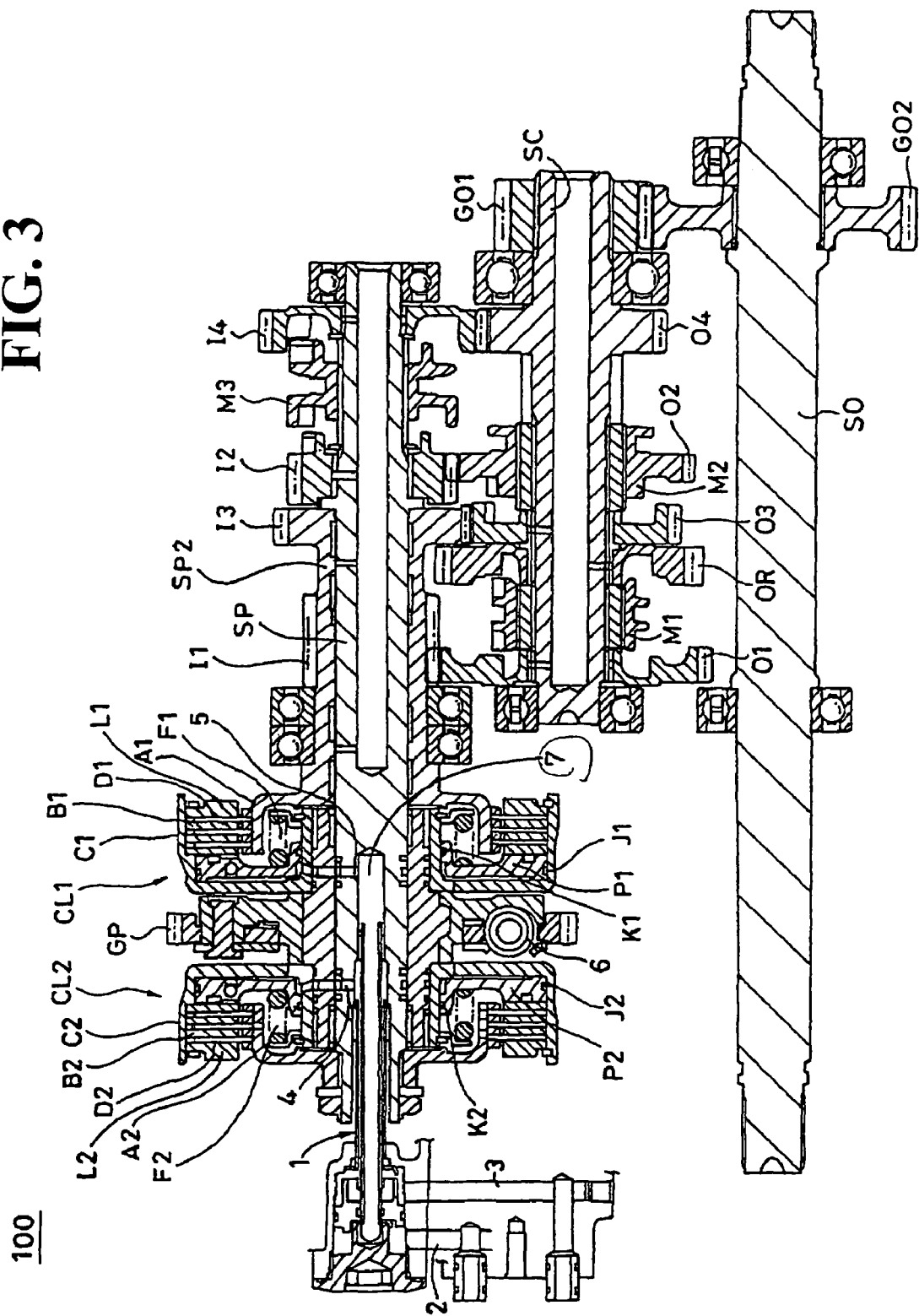
FIG. 3 is a cross-sectional view of an embodiment of an automatic transmission to which a twin clutch according to the present invention is applied.

FIG. 3 is an enlarged cross-sectional view showing details of an embodiment of an automatic transmission 100 according to the present invention, which is applied to the internal combustion engine 10 (FIG. 1) or 50 (FIG. 2) or another internal combustion engine. The automatic transmission 100 is a multi-speed transmission including four forward speeds and one reverse speed. A gear shift action in each speed is performed by a combination of on and off of oil pressures applied to the first and second clutches CL1 and CL2 and sliding actions of first and third sleeves M1 and M3 as gear shift mechanisms in an axial direction.

The twin clutches are composed of the first and second clutches CL1 and CL2 disposed back to back with the primary gear GP interposed therebetween. In the primary gear GP, which is rotatably connected to the primary shaft SP, a shock absorbing mechanism including a spring 6 is incorporated to absorb shock when a driving force is transmitted. In this embodiment, the first and second clutches CL1 and CL2 have the same structure and are composed of a set of the same components and have a substantially disk shape including a thickness. Hereinafter, a description will be given of constituents of the first clutch CL1 as a representative clutch, and constituents of the second clutch CL2 corresponding thereto will be indicated in parentheses.

In the first clutch CL1 (CL2), a piston P1 (P2) inserted and sealed with inside and outside oil seals K1 (K2) and J1 (J2) is provided in a bottom part of a clutch case C1 (C2), which is fixedly connected to the primary gear GP. The piston P1 (P2) is pressed right (left) in the drawing when operating oil is pressure fed from an oil passage 5 (4), which is provided in the axial center of the primary shaft SP. On the other hand, when pressure of the operating oil is lowered, the piston P1 (P2) is returned to the original position by spring back force of the spring F1 (F2).

To the right (left) of the piston P1 (P2) in the drawing, three pressure plates B1 (B2) adjacent thereto and a holding plate L1 (L2) are disposed. The pressure plates B1 (B2) are coupled to the clutch case C1 (C2) so as to be fixed in the rotational direction and slidable in the axial direction. The holding plate L1 (L2) is fixedly connected to the clutch case C1 (C2). Between adjacent ones of the pressure plates B1 (B2) and the holding plate L1 (L2), three clutch plates D1 (D2) are individually sandwiched with slight gaps. The clutch plates D1 (D2) are coupled to an arm A1 (A2) so as to be fixed in the rotational direction and slidable in the axial direction.

With the aforementioned structure, the rotational driving force of the primary gear GP rotates only the clutch case C1 (C2) as long as the piston P1 (P2) is not pressed out by the oil pressure. When the piston P1 (P2) is pressed out by the oil pressure and the pressure plates B1 (B2) and clutch plates D1 (D2) are brought into contact with each other to generate frictional force, the rotational driving force rotating the clutch case C1 (C2) is transmitted to the arm A1 (A2). At this time, controlling the magnitude of the oil pressure can easily make a half clutch state and the like.

An oil passage distributor 1 composed of a double tube is inserted and fixed in an oil gallery 7 provided in the axial center of the primary shaft SP of the automatic transmission 100. Oil pressure supplied to a supply oil passage 2 drives the piston P1 of the first clutch CL1 from an inner tube of the oil passage distributor 1 through the oil passage 5. On the other hand, oil pressure supplied to a supply oil passage 3 drives the piston P2 of the second clutch CL2 through a gap between the inner tube and an outer tube of the oil passage distributor 1 through the oil passage 4.

The arm A1 of the first clutch CL1 is formed integrally with an outer primary shaft SP2. The arm A2 of the second clutch CL2 is fixedly connected to the primary shaft SP. The outer primary shaft SP2, which is rotatably supported about an axis thereof by the primary shaft SP, is provided integrally with a first speed drive gear I1 and a third speed drive gear I3. The first and third speed drive gears I1 and I3 are, respectively, always engaged with first and third speed driven gears O1 and O3, which are individually rotatably supported about respective axes by the countershaft SC. Second and fourth speed drive gears I2 and I4, which are rotatably supported about respective axes by the primary shaft SP, are, respectively, always engaged with second and fourth speed driven gears O2 and O4, which individually rotate integrally with the countershaft SC. An output gear GO1, which is fixedly connected to the right end of the countershaft SC in the drawing, is engaged with an input gear GO2, which is fixedly connected to the output shaft SO. A reverse gear OR, which is rotatably supported about an axis thereof by the countershaft SC, is always engaged with an input gear (not shown) of a reverse output shaft. Hereinafter, a description will be given of a gear shift action in the automatic transmission 100 with reference to FIG. 4.

Figure 4:
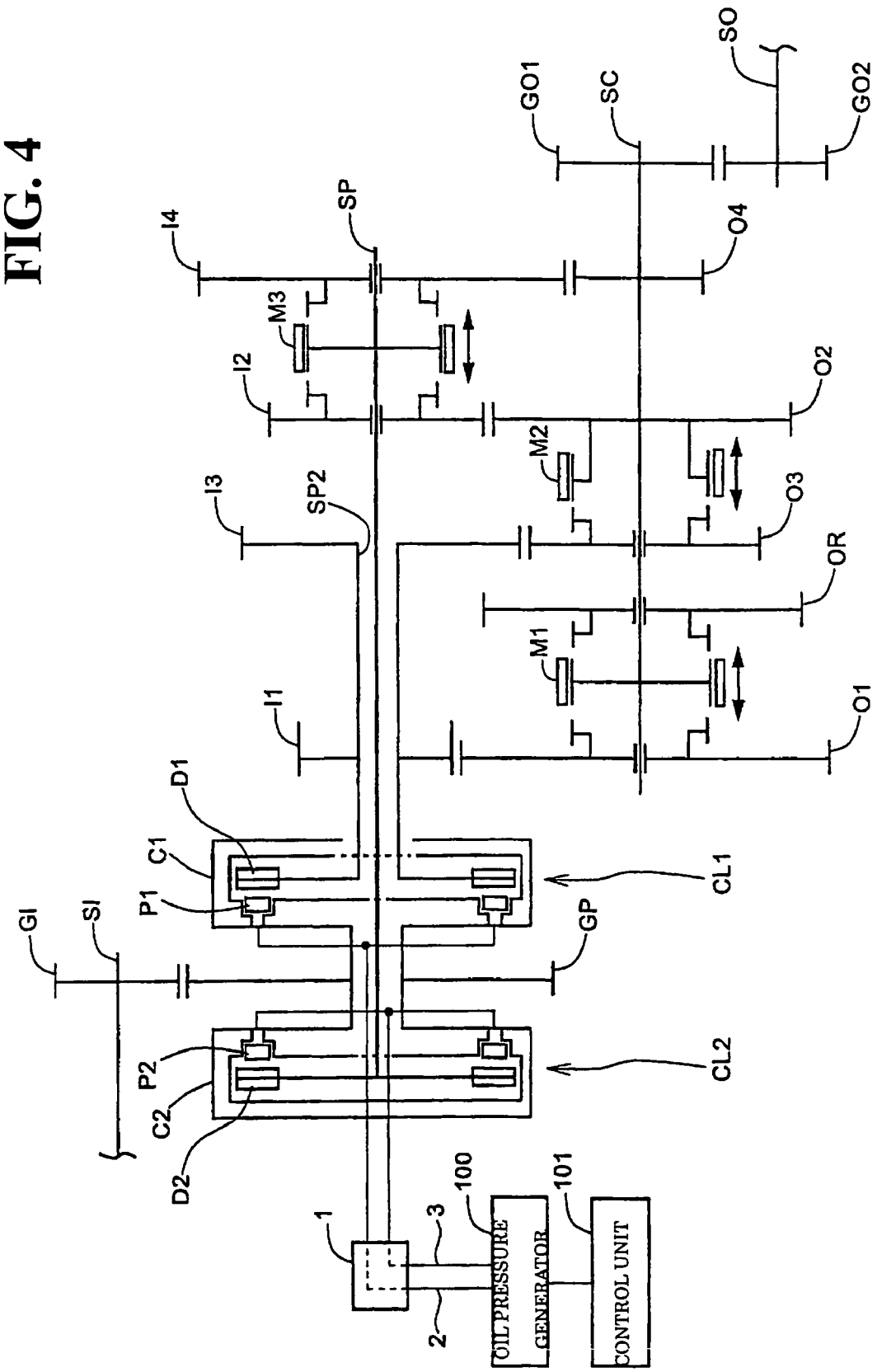
FIG. 4 is a schematic view of the embodiment of the automatic transmission to which the twin clutch according to the present invention is applied.

FIG. 4 is a schematic view of the automatic transmission 100 according to the present invention. The same numerals and letters as those of the above description indicate the same or equivalent portions. An oil pressure generator 101, which independently performs hydraulic control for the first and second clutches CL1 and CL2, is driven based on a signal of a control unit 102. The sliding actions of the first and third sleeves M1 and M3 in the axial direction are performed by a not-shown actuator and the like in conjunction with the operation of the twin clutches.

Hereinafter, an explanation will be given of a relation between the on and off states of the oil pressure to the twin clutches and the sliding actions of the first and third sleeves M1 and M3 in each speed. First, at a neutral position, neither of the first and second clutches CL1 and CL2 is supplied with the oil pressure, and the primary gear GP and clutch cases C1 and C2 integrally rotate idly relative to the primary shaft SP.

Next, in the first speed, the oil pressure is supplied to the first clutch CL1, and a rotational driving force of the primary gear GP is transmitted to the outer primary shaft SP2. The first sleeve M1, which is coupled to the countershaft SC so as to be fixed in the rotational direction and slidable in the axial direction, slides to be connected to the first speed driven gear O1. The rotational driving force is thus transmitted to the countershaft SC through the gear train of the first speed drive gear I1 and the first speed driven gear O1.

Next, in the second speed, a clutch to be supplied with the oil pressure is switched from the first clutch CL1 to the second clutch CL2, and the rotational driving force of the primary gear GP is transmitted to the primary shaft SP. In conjunction with this, the third sleeve M3, which is coupled to the primary shaft SP so as to be fixed in the rotational direction and slidable in the axial direction, slides to be connected to the second speed drive gear I2. The rotational driving force is thus transmitted to the countershaft SC through the gear train of the second speed drive gear I2 and second speed driven gear O2.

In the third speed, the clutch to be supplied with the oil pressure is again switched from the second clutch CL2 to the first clutch CL1, and the second sleeve M2, which is coupled to the countershaft SC so as to be fixed in the rotational direction and slidable in the axial direction, slides to be connected to the third speed driven gear O3. The rotational driving force is thus transmitted to the countershaft SC through the gear train of the third speed drive gear I3 and third speed driven gear O3.

In the fourth speed, the clutch to be supplied with the oil pressure is again switched from the first clutch CL1 to the second clutch CL2, and the third sleeve M3 slides to be connected to the fourth speed drive gear I4. The rotational driving force is thus transmitted to the countershaft SC through the gear train of the fourth speed drive gear I4 and fourth speed driven gear O4. The shift operation to the reverse gear is performed by supplying the first clutch CL1 with the oil pressure and connecting the first speed driven gear O1, which is slidable in the axial direction, to the reverse gear OR.

As described above, the automatic transmission 100 is configured so that gears of each gear pair are always engaged with each other and the connection/disconnection states of the rotational driving force are switched alternately by the two clutches between the adjacent gear ratios, thus allowing a quick gear shift operation with less gear shift shock.

Referring to FIG. 3, the first and second clutches CL1 and CL2, which constitute the twin clutches, are disposed back to back with the primary gear GP of the primary shaft SP interposed therebetween. The oil passages 4 and 5 therefore only need to be disposed linearly in the circumferential direction from the oil gallery 7, which is provided at the axial center of the primary shaft SP. Accordingly, the twin clutches can be controlled with oil passages that have a simple shape and a short total length. Moreover, the sources of the oil pressure and the two oil passages can be concentrated to one end of the primary shaft SP. Shortening the total length of the oil passages and making the two oil passages the same length allows the hydraulic control to easily achieve a uniform response. Moreover, the first and second clutches CL1 and CL2 are composed of the same components, so that the number of production steps can be considerably reduced. Furthermore, there is no need to provide any special oil passage for the crankcase. Accordingly, the basic form of the crankcase can be shared with manual transmission vehicles, and the number of production steps can be reduced. Still furthermore, the outer diameter of the clutches does not affect the distance between the axes of the primary shaft and countershaft. It is therefore possible to obtain a small and lightweight automatic transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic transmission, comprising:
   a gearbox including a main shaft and a countershaft;
   a first clutch and a second clutch, said first clutch and said second clutch performing connection and disconnection of a rotational driving force between a crankshaft and the gear box; and
   a starting clutch or a torque converter disposed on the crankshaft, wherein the first and second clutches are hydraulic clutches and are disposed on the main shaft in back to back orientation, and wherein the first and second clutches are overlapped with said starting clutch or torque converter in the radial direction as viewed along an axis of the main shaft.

2. The automatic transmission according to claim 1, wherein a primary gear that transmits the rotational driving force of the crankshaft to the main shaft is disposed between the first and second clutches.

3. The automatic transmission according to claim 1, wherein the first clutch performs connection and disconnection of the rotational driving force between the crankshaft and any one of an odd gear group and an even gear group of the gearbox, and the second clutch performs connection and disconnection of the rotational driving force between the crankshaft and the other of the odd and even gear groups.

4. The automatic transmission according to claim 2, wherein the first clutch performs connection and disconnection of the rotational driving force between the crankshaft and any one of an odd gear group and an even gear group of the gearbox, and the second clutch performs connection and disconnection of the rotational driving force between the crankshaft and the other of the odd and even gear groups.

5. The automatic transmission according to claim 1, further comprising an oil passage distributor including a double tube inserted and fixed in an oil passage formed through a center of the main shaft, said oil passage distributor supplying oil to said first and second clutches to connect and disconnect said first and second clutches.

6. The automatic transmission according to claim 5, wherein said oil passage distributor includes a first supply oil passage and a second supply oil passage, said first supply oil passage is in communication with the first clutch via a passage formed between the oil passage and an outer tube of the double tube, and said second supply oil passage is in communication with the second clutch via a passage formed between the outer tube and an inner tube of the double tube.

7. The automatic transmission according to claim 2, further comprising an oil passage distributor including a double tube inserted and fixed in an oil passage formed through a center of the main shaft, said oil passage distributor supplying oil to said first and second clutches to connect and disconnect said first and second clutches.

8. The automatic transmission according to claim 7, wherein said oil passage distributor includes a first supply oil passage and a second supply oil passage, said first supply oil passage is in communication with the first clutch via a passage formed between the oil passage and an outer tube of the double tube, and said second supply oil passage is in communication with the second clutch via a passage formed between the outer tube and an inner tube of the double tube.

9. The automatic transmission according to claim 1, wherein said first and second clutches further comprise:
a clutch case;
a piston that is driven by operating oil from a hydraulic oil source;
a spring that biases the piston against the force of the hydraulic oil;
a holding plate; and
a plurality of pressure plates that are coupled to the clutch case so as to be fixed in the rotational direction and slidable in the axial direction.

10. The automatic transmission according to claim 2, wherein said first and second clutches further comprise:
a clutch case;
a piston that is driven by operating oil from a hydraulic oil source;
a spring that biases the piston against the force of the hydraulic oil;
a holding plate; and
a plurality of pressure plates that are coupled to the clutch case so as to be fixed in the rotational direction and slidable in the axial direction.

11. An engine, comprising:
a cylinder head, said cylinder head including a plurality pistons mounted for reciprocation therein;
a cylinder block, said cylinder block including at least one piston mounted for reciprocation therein; and
a crank case, said crank case including:
a crankshaft mounted for rotation therein;
a transmission main shaft;
a starting clutch or a torque converter disposed on the crankshaft; and
a first clutch and a second clutch, said first clutch and said second clutch performing connection and disconnection of a rotational driving force between said crankshaft and said main shaft,
wherein the first and second clutches are hydraulic clutches and are disposed on the main shaft in back to back orientation, and
wherein the first and second clutches are overlapped with said starting clutch or torque converter in the radial direction as viewed along an axis of the main shaft.

12. The engine according to claim 11, wherein
a primary gear that transmits the rotational driving force of the crankshaft to the main shaft is disposed between the first and second clutches.

13. The engine according to claim 11, wherein the first clutch performs connection and disconnection of the rotational driving force between the crankshaft and any one of an odd gear group and an even gear group of the transmission, and the second clutch performs connection and disconnection of the rotational driving force between the crankshaft and the other of the odd and even gear groups.

14. The engine according to claim 12, wherein the first clutch performs connection and disconnection of the rotational driving force between the crankshaft and any one of an odd gear group and an even gear group of the transmission, and the second clutch performs connection and disconnection of the rotational driving force between the crankshaft and the other of the odd and even gear groups.

15. The engine according to claim 11, further comprising an oil passage distributor including a double tube inserted and fixed in an oil passage formed through a center of the main shaft, said oil passage distributor supplying oil to said first and second clutches to connect and disconnect said first and second clutches.

16. The engine according to claim 15, wherein said oil passage distributor includes a first supply oil passage and a second supply oil passage, said first supply oil passage is in communication with the first clutch via a passage formed between the oil passage and an outer tube of the double tube, and said second supply oil passage is in communication with the second clutch via a passage formed between the outer tube and an inner tube of the double tube.

17. The engine according to claim 12, further comprising an oil passage distributor including a double tube inserted and fixed in an oil passage formed through a center of the main shaft, said oil passage distributor supplying oil to said first and second clutches to connect and disconnect said first and second clutches.

18. The engine according to claim 17, wherein said oil passage distributor includes a first supply oil passage and a second supply oil passage, said first supply oil passage is in communication with the first clutch via a passage formed between the oil passage and an outer tube of the double tube, and said second supply oil passage is in communication with the second clutch via a passage formed between the outer tube and an inner tube of the double tube.

19. The engine according to claim 11, wherein said first and second clutches further comprise:
- a clutch case;
- a piston that is driven by operating oil from a hydraulic oil source;
- a spring that biases the piston against the force of the hydraulic oil;
- a holding plate; and
- a plurality of pressure plates that are coupled to the clutch case so as to be fixed in the rotational direction and slidable in the axial direction.

20. The engine according to claim 12, wherein said first and second clutches further comprise:
- a clutch case;
- a piston that is driven by operating oil from a hydraulic oil source;
- a spring that biases the piston against the force of the hydraulic oil;
- a holding plate; and
- a plurality of pressure plates that are coupled to the clutch case so as to be fixed in the rotational direction and slidable in the axial direction.

21. The automatic transmission according to claim 1, wherein said starting clutch or torque converter is the starting clutch.

22. The engine according to claim 11, wherein said starting clutch or torque converter is the starting clutch.

* * * * *